(12) United States Patent
Lee et al.

(10) Patent No.: US 6,466,391 B1
(45) Date of Patent: Oct. 15, 2002

(54) HEAD RETRACTION CIRCUIT

(75) Inventors: Han-Seung Lee; Shi-Hong Park, both of Seoul (KR)

(73) Assignee: Fairchild Korea Semiconductor Ltd., Kyungki-do (KR)

( * ) Notice: Subject to any disclaimer, the term of this patent is extended or adjusted under 35 U.S.C. 154(b) by 0 days.

(21) Appl. No.: 09/317,413

(22) Filed: May 24, 1999

(30) Foreign Application Priority Data

May 22, 1998 (KR) .......................................... 98-18469

(51) Int. Cl.[7] .............................................. G11B 21/02
(52) U.S. Cl. .................. 360/75; 360/78.05; 360/78.012
(58) Field of Search .............................. 360/75, 78.01, 360/78.05, 78.12

(56) References Cited

U.S. PATENT DOCUMENTS

| | | | | |
|---|---|---|---|---|
| 4,658,308 A | * | 4/1987 | Sander, Jr. ................. 360/74.1 |
| 4,831,469 A | * | 5/1989 | Hanson et al. ................. 360/75 |
| 5,729,399 A | * | 3/1998 | Albrecht et al. ............... 360/75 |
| 6,025,968 A | * | 2/2000 | Albrecht ....................... 360/75 |
| 6,236,527 B1 | * | 5/2001 | Uchiike et al. ................ 360/75 |
| 6,239,935 B1 | * | 5/2001 | Shrinkle ....................... 360/75 |

* cited by examiner

*Primary Examiner*—Andrew L. Sniezek
*Assistant Examiner*—Mitchell Slavitt
(74) *Attorney, Agent, or Firm*—Marshall, Gerstein & Borun

(57) ABSTRACT

A head retraction circuit receives a retraction signal from a microprocessor and sequentially turns on first and second drivers connected across a voice coil motor (VCM) winding of a hard disk drive system. The retraction circuit generates a first control signal to turn on a first driver in response to receiving the retraction signal and generates a second control signal to turn on the second driver a predetermined time interval after receiving the retraction signal. The retraction circuit thereby provides current to the VCM winding to retract a head to a safety zone of a disc after the predetermined time interval so that any momentum in the VCM has substantially dissipated prior to retracting the head.

7 Claims, 5 Drawing Sheets

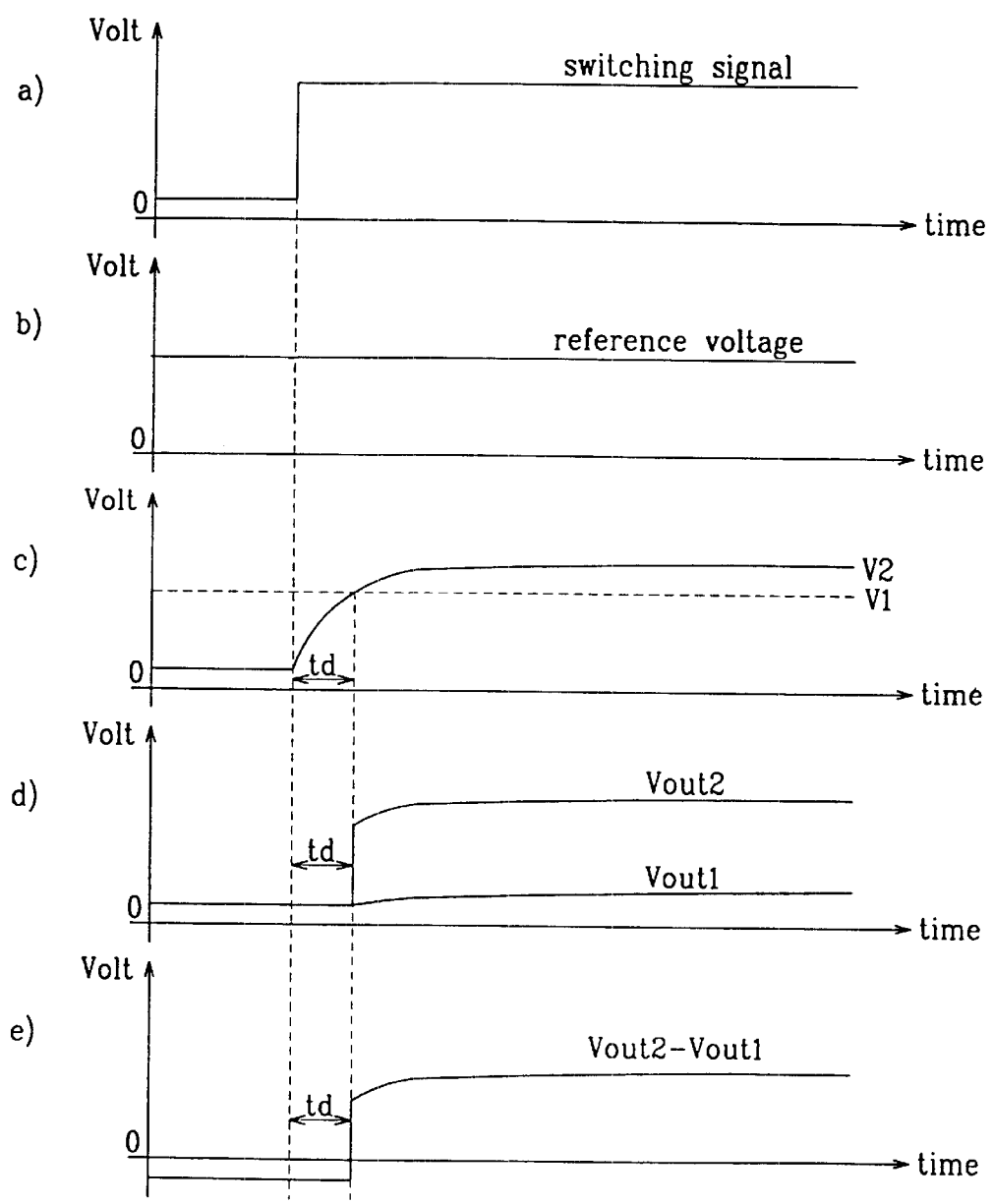

HEAD RETRACTION CIRCUIT

BACKGROUND OF THE INVENTION

1. Field of the Invention

The invention relates generally to a hard disk drive (HDD) system. More particularly, the invention relates to a head retraction circuit having a hold function that controls a head reading a disc so that the head is parked within a safety zone of the disc.

2. Description of Related Technology

FIG. 1 illustrates a plan view of a portion of the inside of a typical HDD system 15 that may, for example, be used as a non-volatile mass data storage device within a personal computer system (not shown). The HDD system 15 includes a disc 10, which has a safety zone 11 and a data zone 12, and a head 20 to read or write digital data on the disc 10. When the HDD system 15 is unpowered (i.e., the system 15 is not in operation), the head 20 is preferably parked within the safety zone 11 of the disc 10. As is known in the art, parking the head 20 within the safety zone 11 helps to prevent "crashes" or contacts of the head 20 on the data zone 12 of the disc 10, thereby preventing the inadvertent loss of data due to mechanical damage of the data zone 12 of the disc 10.

In operation, the HDD system 15 uses a spindle motor (not shown) to rotate the disc 10 at a predetermined speed and a voice coil motor (VCM) that moves the head 20 radially over the data zone 12 of the rotating disc 10 to read and/or write digital data thereon. Control of the spindle motor and the VCM is typically accomplished using a microprocessor or microcontroller (not shown) that executes a control program and which provides the appropriate control signals to the motors.

Initially, the HDD system 15 is unpowered, the disc 10 is not rotating, and the head 20 is preferably parked within the safety zone 11 of the disc 10. When power is applied to the HDD system 15, the microprocessor provides signals to the spindle motor so that the disc 10 is caused to rotate at a predetermined velocity. When the disc 10 reaches the predetermined velocity, the microprocessor provides signals to control the VCM so that the head 20 exits the safety zone 11 and moves radially over the data zone 12 to read and write digital data thereon. Conversely, when power is removed from the HDD system 15, the microprocessor provides signals to the spindle motor to stop the motor and provides signals to the VCM so that the head 20 is retracted or parked within the safety zone 11.

FIG. 2 illustrates a block diagram of a conventional a head retraction circuit 5 for the HDD system 15 that provides an automatic retraction or parking function for the head 20. The head retraction circuit 5 includes a switching unit 1, a reference voltage generator 2, and first and second driver circuits 3, 4. The reference voltage generator 2 provides a substantially constant reference voltage to the switching unit 1. The switching unit 1, receives the reference voltage and control signals from the microprocessor (not shown) and provides control signals to the drivers 3, 4. The drivers 3, 4 convert the control signals to provide current signals to the VCM winding that retract the head 20 to the safety zone 11 of the disc 10.

FIG. 3 illustrates an exemplary detailed schematic diagram of the retraction circuit 5 shown in FIG. 2. As shown, the reference voltage generator 2 includes a resistor R2 and transistors Q17–Q20 having their base-collector terminals connected to provide a diode function. The resistor R2 and the transistors Q17–Q20 are connected in series across a supply voltage VCC to provide a substantially constant reference voltage of about 2.8 volts (i.e., four diode drops) to the switching unit 1.

The switching unit 1, includes transistors Q1–Q3 connected as shown. The base terminal of transistor Q3 receives the reference voltage from the reference voltage generator 2 and transistor Q1 receives an input signal (SWITCH) from the microprocessor. If the SWITCH input is high (i.e., the voltage on the base terminal of transistor Q1 is sufficient to forward bias the base-emitter of Q1) then transistor Q1 is ON and shunts across the collector-emitter of transistor Q2 so that transistor Q2 is OFF. As will be described in greater detail below, when transistor Q2 is OFF, both drivers 3, 4 are OFF so that no current is supplied to the VCM winding and the head 20 does not retract. Conversely, if the SWITCH input is low (i.e., about zero volts) then transistor Q1 is OFF and transistor Q3 uses the reference voltage at its base terminal to provide control signals via its emitter terminal to turn ON the drivers 3, 4 to supply current to the VCM winding and retract the head 20.

The first driver 3 includes transistors Q4–Q10 and resistors R3 and R4, all connected as shown. Those skilled in the art will recognize that transistors Q5 and Q6 are connected in a current mirror configuration so that the amount of current flowing through diode-connected transistor Q5 is caused to flow through the collector terminal of transistor Q6. When transistor Q6 conducts, a bias voltage is developed across resistor R3 and transistors Q7 and Q8. This bias voltage is coupled to the base terminal of transistor Q9 to turn ON transistor Q9. Transistors Q9 and Q10 are connected in a Darlington configuration having a common emitter output (OUT1), which is connected to the VCM winding. Thus, when Q9 is ON, Q10 is also ON and may conduct a large amount of current while a very small current (i.e., Q10 collector current divided by the product of the betas for Q9 and Q10) is provided to the base terminal of transistor Q9.

The second driver 4 includes transistors Q11–Q16 and resistors R6–R8, all connected as shown. Transistors Q12 and Q13 are connected in a current mirror configuration. Transistor Q14 and resistor R6 generate a bias voltage across the base-emitter junction of transistor Q15 via the current provided by current mirror transistor Q13. Transistor Q15 is connected to Q14 and R6 to amplify the current mirror current and to provide the amplified current to resistor R7 and the base terminal of transistor Q16. The amplified current mirror current is available to drive transistor Q16 to control the conduction through its collector terminal, which is connected to the VCM winding.

The switching unit 1 controls the ON/OFF condition of the drivers 3, 4 in response to signals from the microprocessor. In particular, when the microprocessor applies a high level signal to the base terminal of transistor Q1 then Q1 is ON and shunts across the collector-emitter of transistor Q2, and Q2 is OFF. When Q2 is OFF, the current mirror transistors Q5 and Q12 of the drivers 3, 4 are OFF and output drive transistors Q10, Q16 are OFF so that no current is provided to the VCM to retract the head 20. Alternatively, when the microprocessor applies a low level retraction signal to the base terminal of transistor Q1, then Q1 is OFF and Q2 is ON so that the current mirror transistors Q5 and Q12 are operational. With the current mirrors operational, the output drive transistors Q10, Q16 of the drivers 3, 4 are both ON so that current is provided to the VCM winding to retract the head 20.

The above-described conventional head retraction circuitry is directly responsive to a retraction signal from the microprocessor and does not compensate for VCM momentum. As a result, because the motion of the head 20 at the time the switching unit 1 receives the retraction signal from the microprocessor is not determinate, the parked location of the head 20 can vary significantly. For example, if the VCM is moving the head 20 away from the safety zone 11 at the time the retraction signal is received by the switching unit 1, the momentum of the VCM may prevent the head 20 from being retracted sufficiently to be parked within the safety zone 11. Conversely, if the VCM is moving the head 20 toward the safety zone 11 at the time the retraction signal is received, the momentum of the VCM may cause the head 20 to retract too far so that it is parked inside the inner radius of the safety zone 11.

SUMMARY OF THE INVENTION

In accordance with one aspect of the invention, a head retraction circuit for supplying current to a voice coil motor (VCM) to retract a head into a safety zone of a disc includes a switching unit adapted to receive a retraction signal and to produce a first control signal in response to the retraction signal, a first driver coupled to the VCM and the switching unit and adapted to provide current to the VCM in response to the first control signal, a holding unit coupled to the switching unit and adapted to receive the first control signal and to subsequently produce a second control signal after a predetermined time interval, and a second driver coupled to the VCM, the holding unit, and the switching unit and adapted to provide current to the VCM in response to the second control signal, whereby the first and second drivers provide current to the VCM to retract the head into the safety zone after momentum in the VCM has substantially dissipated.

The invention itself, together with further objects and attendant advantages, will best be understood by reference to the following detailed description, taken in conjunction with the accompanying drawings.

BRIEF DESCRIPTION OF THE DRAWINGS

FIGS. 6(a)–6(e) illustrate exemplary waveforms associated with the head retraction circuit shown in FIG. 5.

DETAILED DESCRIPTION OF THE PREFERRED EMBODIMENTS

Figure 1:
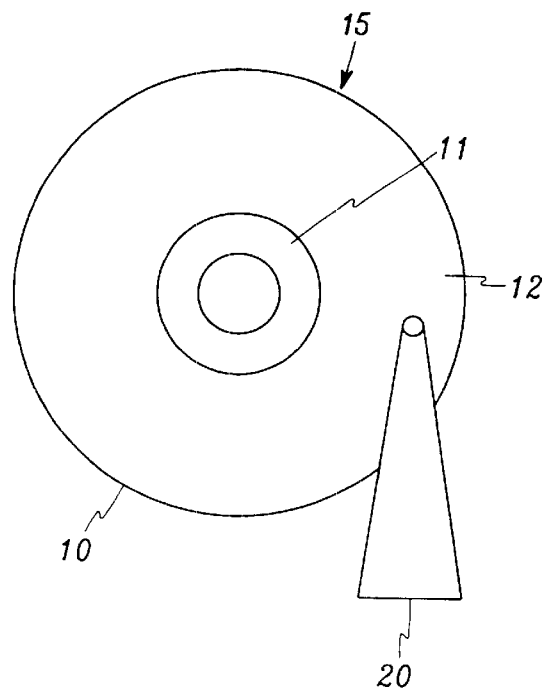
FIG. 1 illustrates a plan view of a portion of the inside of a typical hard disk drive system.
Figure 2:
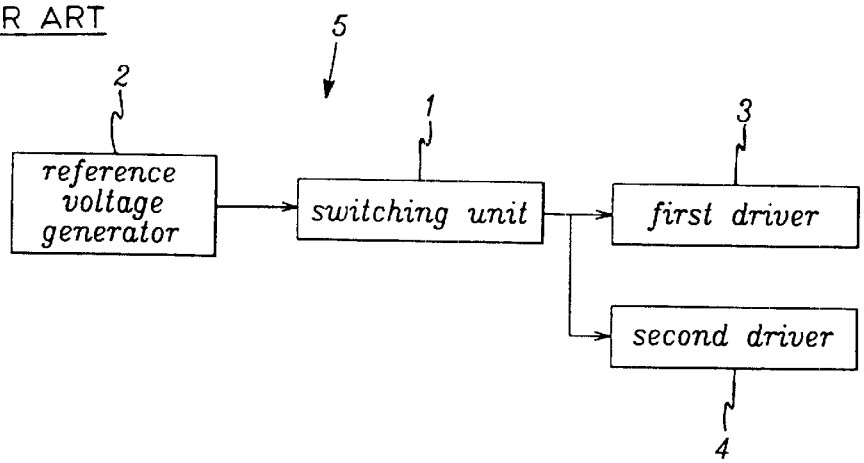
FIG. 2 illustrates a block diagram of a conventional automatic head retraction circuit that may be used with the hard disk system shown in FIG. 1.
Figure 3:
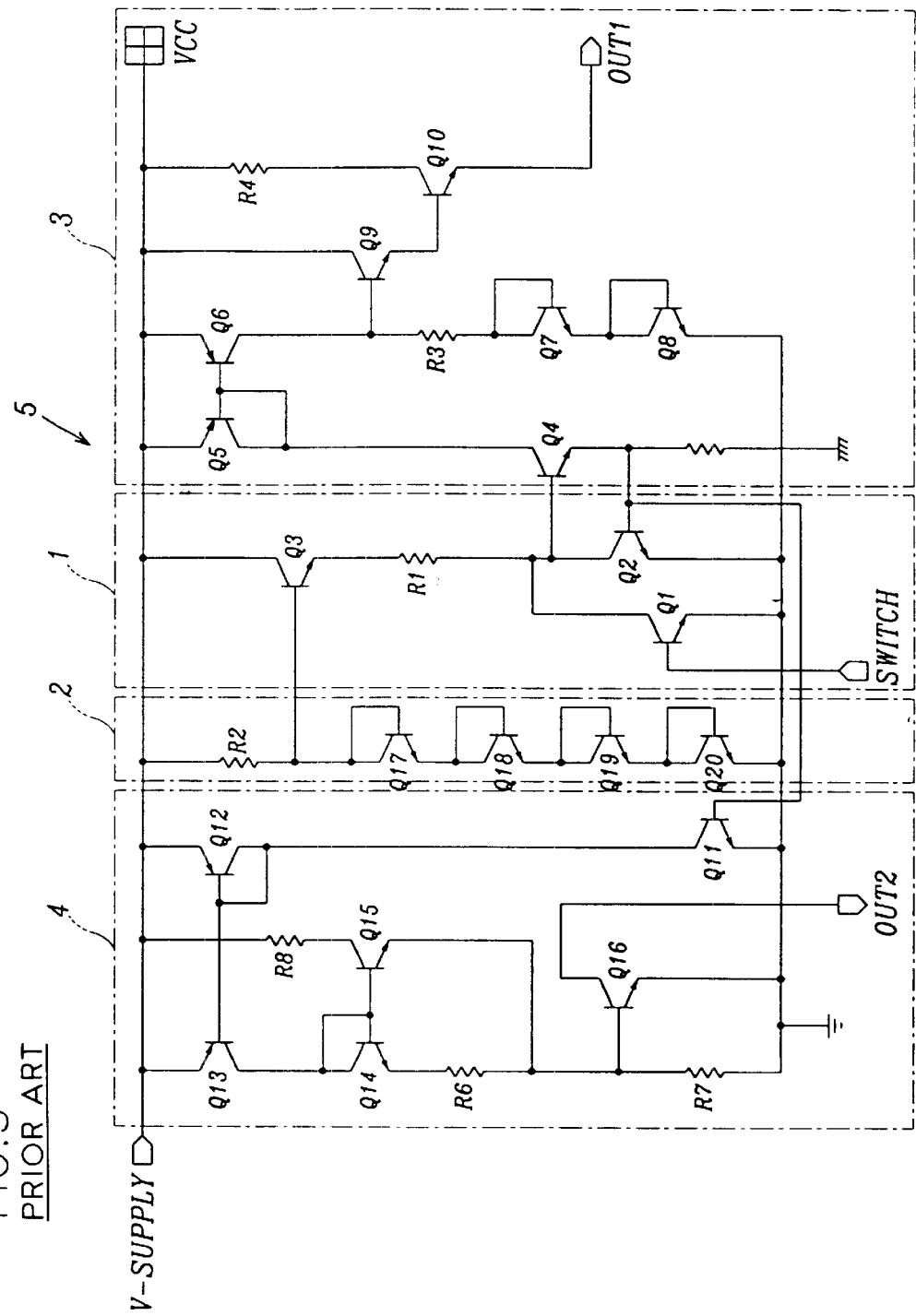
FIG. 3 illustrates an exemplary detailed schematic diagram of the retraction circuit shown in FIG. 2.
Figure 4:
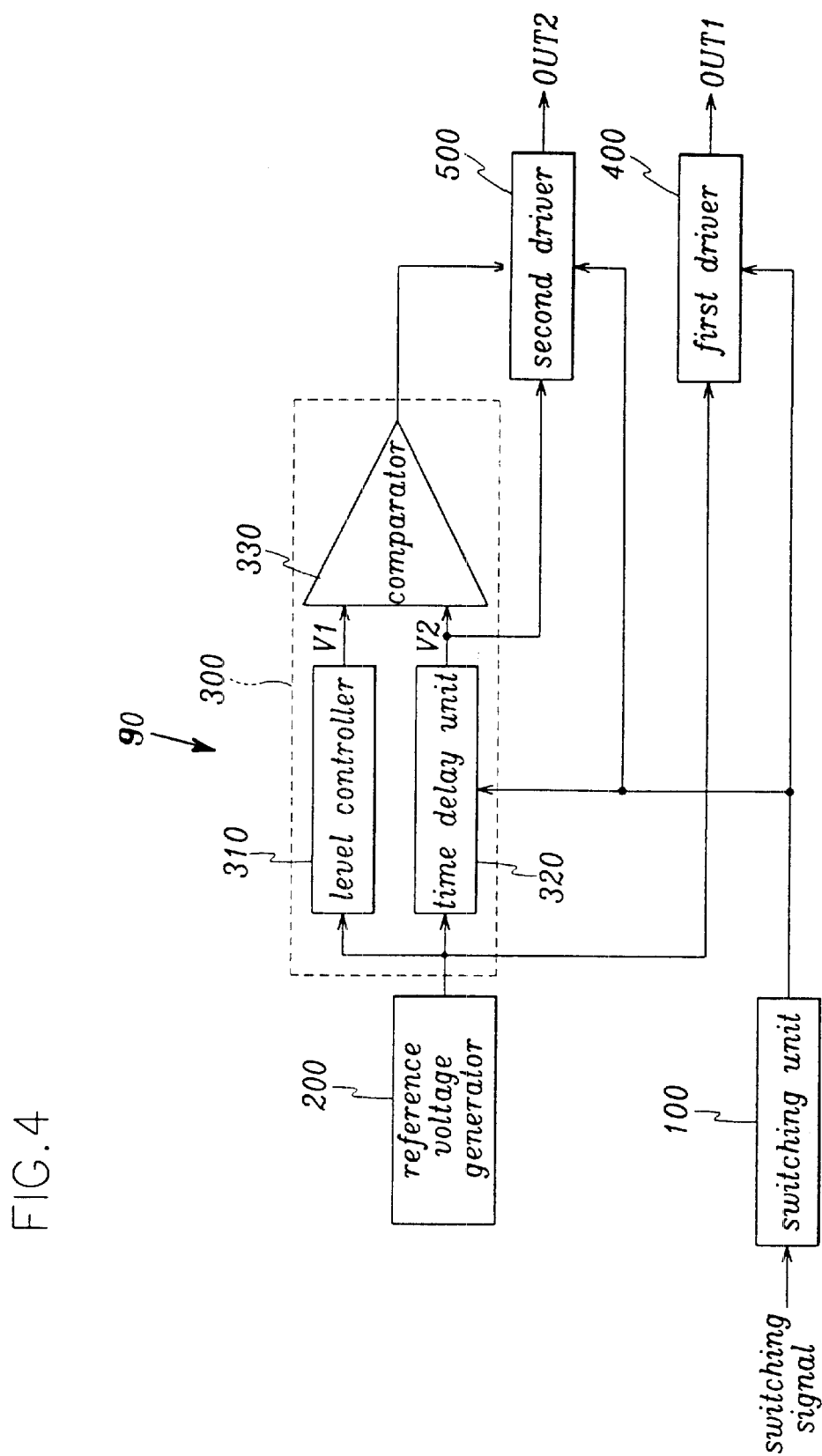
FIG. 4 is a block diagram of a head retraction circuit according to one embodiment of the invention.

FIG. 4 illustrates, by way of example only, a block diagram of a head retraction circuit 90 according to one embodiment of the invention. The head retraction circuit 90 may be used in connection with the HDD system 15 shown in FIG. 1, for example, and includes a switching unit 100, a reference voltage generator 200, a holding unit 300, and drivers 400, 500 having outputs (OUT1 and OUT2) that are connected across the winding of a VCM (not shown).

While the HDD system 15 is operational, and the disc 10 is rotating, the drivers 400, 500 are OFF, and do not provide control currents to the VCM to retract the head 20 to the safety zone 11. Conversely, when the HDD system 15 is deactivated, the microprocessor provides a retraction signal to the switching unit 100 to sequentially turn ON the drivers 400, 500, to cause the VCM to retract the head 20 to the safety zone 11.

In general, the switching unit 100 and the holding unit 300 cooperate so that the drivers 400, 500 are turned ON sequentially so that first driver 400 is turned ON upon receiving the retraction signal from the microprocessor and the second driver 500 is turned ON a predetermined amount of time after the switching unit 100 has received the retraction signal. The holding unit 300 "holds" or delays the control signals that turn ON the second driver 500 so that any momentum of the VCM is dissipated before retracting the head 20 to the safety zone 11. As a result, the head 20 is consistently retracted into the safety zone 11 regardless of the VCM momentum at the time the switching unit 100 receives the retraction signal from the microprocessor.

The holding unit 300 further includes a level controller 310, a time delay unit 320, and a comparator 330. The level controller 310 receives a substantially constant reference voltage from the reference voltage generator 200 and generates a substantially constant threshold voltage (V1) that is applied to an input terminal of the comparator 330. The time delay unit 320 receives the reference voltage and control signals from the switching unit 100 and provides a time-delayed control voltage (V2) to another input of the comparator 330. When the switching unit 100 is not receiving a retraction signal from the microprocessor, the control signals provided to the time delay unit 320 maintain the voltage V2 below the threshold voltage (V1), and may, for example, be at about zero volts. When the switching unit 100 receives a retraction signal from the microprocessor, control signals are then provided to the time delay unit 320 that cause the voltage V2 to increase at a predetermined rate.

The comparator 330 compares the threshold voltage V1 and the time-delayed voltage V2 and is preferably configured to provide a high level output (at VOUT) when V1>V2 and a low level output when V1<V2. A high level output from the comparator 330 holds the second driver in an OFF condition and a low level output from the comparator 330 turns the second driver ON so that current is provided to the VCM winding to cause the head 20 to retract to the safety zone 11. Thus, when the switching unit 100 initially receives a retraction signal from the microprocessor, the first driver 400 is turned ON and the second driver 500 is held in an OFF condition for a predetermined amount of time by the holding unit 300. During the holding interval, the time-delayed voltage V2 increases and when V2>V1 the output of the comparator 330 changes from a high level to a low level condition, thereby causing the second driver to be turned ON so that current is provided to the VCM winding to retract the head 20 to the safety zone 11 after any momentum of the VCM has dissipated.

Figure 5:
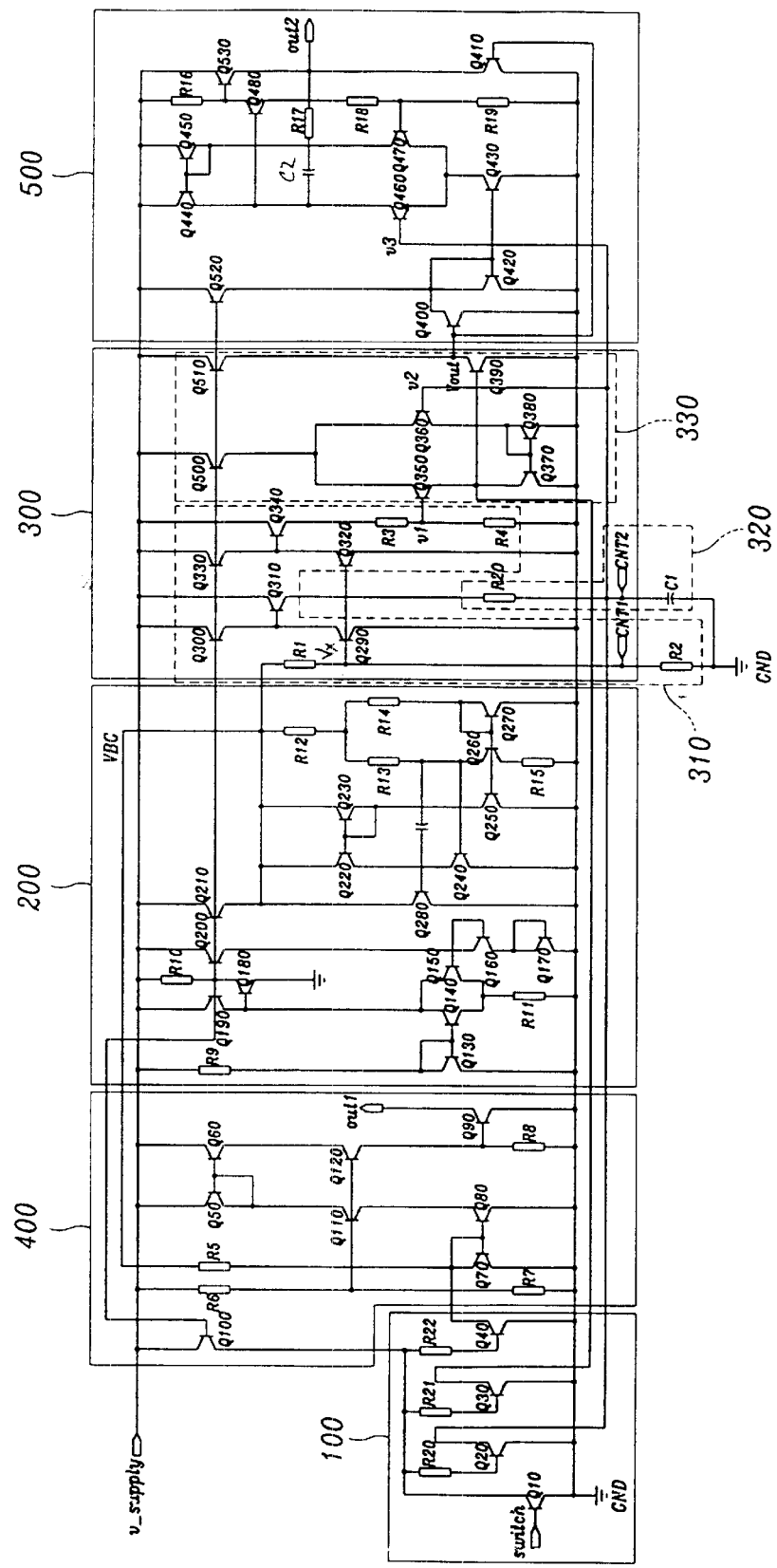
FIG. 5 is an exemplary detailed schematic diagram of the head retraction circuit of FIG. 4.

FIG. 5 illustrates an exemplary detailed schematic diagram of the head retraction circuit of FIG. 4. The switching unit 100 includes transistors Q10–Q40 and resistors R20–R22, all connected as shown. Transistors Q20–Q40 provide open-collector control signals to the second driver 500, the holding unit 300, and the first driver 400, respectively. Transistors Q20–Q40 function as enable/disable switches to enable/disable the operation of the holding unit 300 and the drivers 400, 500 in response to a retraction signal that is received by the base terminal of transistor Q10. When there is no retraction signal present on the base terminal of Q10 (i.e., a logical low, which may be about zero volts), Q10 is OFF and Q20–Q40 are biased ON via base resistors R20–R22. When Q20–Q40 are ON, transistor Q460 is turned OFF to disable the second driver, transistors Q360–Q390 are turned OFF to disable the holding unit 300, and transistors Q70–Q80 are turned OFF to disable the first driver 400. As a result, the drivers 400, 500 do not provide current to the VCM winding, and the head 20 is not retracted. Conversely, when a logical high retraction signal is applied to the base terminal of transistor Q10, Q10 shunts the base terminals of Q20–Q40 to ground so that their open collector outputs are OFF and the holding unit 300 and drivers 400, 500 are enabled to retract the head 20.

The reference voltage generator 200 includes transistors Q130–Q280 and resistors R9–R15, all connected as shown, to provide a conventional band-gap voltage reference, as is generally known in the art. The band gap reference voltage (VBG) is provided to the holding unit 300 and the first driver 400.

The level controller 310 includes transistors Q290–Q340 and resistors R1–R4, all connected as shown. Resistors R1 and R2 function as a voltage divider to produce a substantially constant voltage Vx, which is a portion of the band gap voltage VBG that is applied to the base terminals of transistors Q290 and Q320. Transistors Q320 and Q340 form a buffer so that the voltage Vx is provided at the emitter of Q340 and to a voltage divider formed by resistors R3 and R4. The voltage divider of R3 and R4 divides Vx to produce the threshold voltage V1. Thus, one of ordinary skill in the art will appreciate that the threshold voltage V1 is simply a ratiometric portion of the band gap voltage VBG. Similarly, transistors Q290 and Q310 form a buffer that provides the voltage Vx to the time delay unit 320.

The time delay unit 320 includes resistor R20 and capacitor C1 that are series connected as shown. The buffered voltage Vx is received by resistor R20 and, as will be described further below, is used to charge capacitor C1 at a predetermined rate to define the holding interval of the holding unit 300. The voltage across capacitor C1 is the time-delayed voltage V2 of the time delay unit 320. The time-delayed voltage V2 is provided to the comparator 330 and the second driver 500.

The comparator 330 includes transistors Q350–Q90, Q500, and Q510. Transistors Q350 and Q360 form a differential amplifier that compares the time-delayed voltage V2 to the threshold voltage V1. When the threshold voltage V1 is greater than the time delay voltage V2, which is the case when the switching unit 100 is not receiving a retraction signal from the microprocessor, transistor Q350 is OFF and transistor Q360 is ON. When transistor Q360 is ON a current mirror formed by transistors Q370 and Q380 functions to turn OFF transistor Q390 by pulling its base terminal to about zero volts (i.e., ground), which results in a high-level signal at the output (VOUT) of the comparator 330 that maintains the second driver 500 in an OFF condition. Conversely, when the charge on capacitor C1 has increased during the hold interval so that the time-delayed voltage V2 is greater than the threshold voltage V1, transistor Q360 is OFF and transistor Q350 drives the base terminal of transistor Q390 so that a low-level signal is provide at the output terminal (VOUT) of the comparator 330. When the output of the comparator 330 is at a low-level, the second driver 500 is activated to provide current to the VCM to cause the head 20 to retract to the safety zone 11.

The first driver 400 includes transistors Q50–Q120 and resistors R5–R8, all connected as shown. Transistors Q70 and Q80 form a current mirror having a predetermined current set by bias resistor R5 and the band gap voltage VBG. As indicated above, this current mirror is enabled/disabled via transistor Q40 of the switching unit 100 so that the first driver 400 is enabled/disabled responsive to control signals from the switching unit 100. A resistive divider formed by resistors R5 and R6 provides bias to the base terminals of transistors Q110 and Q120. Transistors Q50 and Q60 form a current mirror that maintains the current in the collectors of transistors Q110 and Q120 to be substantially equal. Transistor Q120 together with resistor R8 provide bias to the base terminal of transistor Q90. Transistor Q90 is connected in an open collector configuration to the VCM winding. When the switching unit 100 receives a retraction signal from the microprocessor, transistor Q40 is OFF, the current mirror formed by Q70/Q80 is enabled, and output transistor Q90 is ON. Thus, when the second driver 500 is turned ON (following the holding interval) current will be provided to the VCM winding to retract the head 20 to the safety zone 11.

The second driver 500 includes transistors Q400–Q480, Q520, and Q530, resistors R16–R19, and capacitor C2, all connected as shown. Transistors Q420 and Q430 form a current mirror that can be enabled/disabled via the output (VOUT) of the comparator 330 to turn ON/OFF the second driver 500. Transistor Q410 is used to maintain the output (OUT2) of the second driver 500 at about zero volts when it is in an OFF condition. Transistors Q460 and Q470 are connected in a differential amplifier configuration. Transistors Q440 and Q450 are connected in a current mirror configuration to provide a balanced high impedance load for the collectors of Q460 and Q470. Resistors R18 and R19 form a negative feedback network that defines a closed-loop gain equal to (1+R18/R19) for the differential amplifier formed by transistors Q460 and Q470. Thus, the drive voltage at the base terminal of open collector output transistor Q350 is approximately V3*(1+R18/R19). As is known in the art, resistor R17 and capacitor C2 may be included to provide stability compensation and/or regenerative positive feedback to prevent spurious switching of the second driver 500.

FIG. 6 illustrates exemplary waveforms of signals associated with the operational characteristics of the head retraction circuit shown in FIG. 5. In operation, the reference voltage generator 200 produces a substantially constant band gap voltage (i.e., about 1.3 VDC), and the switching unit 100 receives a control signal, such as that shown in FIG. 6(a), at the base terminal of transistor Q10. When the control signal is at a low level (i.e., about zero volts), the transistors Q20–Q40 in the switching unit 100 are ON, which drives transistors Q70, Q80, Q360, Q370, and Q430 into an OFF condition to disable the holding unit 300 and the drivers 400, 500. As a result, the head 20 is not retracted to the safety zone 11. Additionally, when the control signal is at a low level, transistor Q20 maintains time delay capacitor C1 at about zero volts so that the time-delayed voltage V2 is at about zero volts.

When the microprocessor sends a retraction signal to the switching unit 100, the control signal transitions to a high level as shown in FIG. 6(a). In response to this high level signal, transistors Q20–Q40 in the switching unit 100 are turned OFF to enable the holding unit and the drivers 400, 500. Upon enablement, the first driver is turned ON and the second driver remains OFF due to the high level output from the comparator 330. Thus, because the drivers 400, 500 are connected across the VCM winding and the second driver is OFF, no current can flow in the VCM winding to retract the head 20. Also, as shown in FIG. 6(c), upon enablement, the capacitor C1 in the time delay unit 320 is allowed to charge at a predetermined rate. After a predetermined amount of time has passed (i.e., the holding interval), the time-delayed voltage V2 across C1 is greater than the threshold voltage V1 and the comparator 330 provides a low level signal on its output (VOUT) that turns ON the second driver 500, as illustrated in FIG. 6(*d*). When the second driver 500 is turned ON, the VCM winding is provided current via a voltage differential (VOUT2–VOUT1), as shown in FIG. 6(*e*), to retract the head 20 to the safety zone 11.

Those of ordinary skill in the art will appreciate that the above-described invention provides a head retraction circuit that consistently parks the head of a HDD system within a safety zone of the HDD disc to prevent inadvertent damage to the data region of the disc. In particular, the circuit provides a time delay or holding interval following a retraction signal that allows any momentum in the VCM to be dissipated prior to parking the head.

A range of changes and modifications can be made to the preferred embodiment described above. The foregoing detailed description should be regarded as illustrative rather than limiting and the following claims, including all equivalents, are intended to define the scope of the invention.

What is claimed is:

1. A head retraction circuit for supplying current to a voice coil motor (VCM) to retract a head into a safety zone of a disc, comprising:

a switching unit adapted to receive a retraction signal and to produce a first control signal in response to the retraction signal;

a first driver coupled to the VCM and the switching unit and adapted to provide current to the VCM in response to the first control signal;

a holding unit coupled to the switching unit and adapted to receive the first control signal and to subsequently produce a second control signal after a predetermined time interval; and a second driver coupled to the VCM, the holding unit, and the switching unit and adapted to provide current to the VCM in response to the second control signal, wherein the first and second drivers are adapted to provide current to the VCM to retract the head into the safety zone after momentum in the VCM has substantially dissipated.

2. The head retraction circuit of claim 1, wherein the holding unit further comprises:

a level controller adapted to generate a substantially constant threshold voltage;

a time delay unit receiving the first control signal and adapted to produce a time-delayed voltage in response to the first control signal; and a comparator coupled to the level controller and the time delay unit and adapted to compare the time-delayed voltage to the threshold voltage and to change the second control signal when the time-delayed voltage crosses the threshold voltage.

3. The head retraction circuit of claim 2, wherein the time-delayed voltage increases to exceed the threshold voltage in response to the first control signal.

4. The head retraction circuit of claim 3, wherein the comparator causes the second control signal to be a low level output when the time-delayed voltage exceeds the threshold voltage.

5. The head retraction circuit of claim 3, wherein the time delay unit comprises a capacitor.

6. The head retraction circuit of claim 1, further comprising a reference voltage generator coupled to the holding unit and the first driver.

7. The head retraction circuit of claim 6, wherein the reference voltage generator is a band gap reference circuit.

* * * * *